United States Patent [19]

Aoki et al.

[11] Patent Number: 5,012,699
[45] Date of Patent: May 7, 1991

[54] APPARATUS FOR CONTROLLING GEARSHIFTS IN AUTOMATIC TRANSMISSION

[75] Inventors: Takashi Aoki; Noboru Sekine; Shigeo Ozawa, all of Saitama; Takamichi Shimada, Tokyo, all of Japan

[73] Assignee: Honda Giken Kogyo Kabushiki Kaisha, Tokyo, Japan

[21] Appl. No.: 353,829

[22] Filed: May 18, 1989

[30] Foreign Application Priority Data

May 20, 1988 [JP] Japan ................... 63-123296

[51] Int. Cl.⁵ .............................. B60K 41/08
[52] U.S. Cl. ........................ 74/869; 74/867
[58] Field of Search ............ 74/866, 867, 868, 869

[56] References Cited

U.S. PATENT DOCUMENTS

| | | | |
|---|---|---|---|
| 3,832,915 | 9/1974 | Hiramatsu | 74/869 |
| 4,274,308 | 6/1981 | Iwanaga et al. | 74/869 |
| 4,445,401 | 5/1984 | Ishimaru | 74/867 X |
| 4,476,747 | 10/1984 | Kawamoto | 74/868 X |
| 4,495,837 | 1/1985 | Morscheck | 74/869 |
| 4,685,356 | 8/1987 | Iwatsuki | 74/866 |
| 4,713,989 | 12/1987 | Hayakawa et al. | 74/867 X |
| 4,748,809 | 6/1988 | Sumiya et al. | 74/869 X |
| 4,791,568 | 12/1988 | Hiramatsu et al. | 74/869 X |

FOREIGN PATENT DOCUMENTS 60-211152 10/1985 Japan .
61-189354 8/1986 Japan .

OTHER PUBLICATIONS

English translation summary of Japanese Appln. 61-189354 and 60-211152.

Primary Examiner—Rodney H. Bonck
Assistant Examiner—Ryan Massey
Attorney, Agent, or Firm—Lyon & Lyon

[57] ABSTRACT

When a gearshift command for a power-on/downshift or power-off/upshift mode is issued, the magnitude of a change in the engine rotational speed due to the gearshift is calculated from the vehicle speed or the engine rotational speed when the gearshift starts to be effected and the gear ratio of a gear position to be reached by the gearshift. If the magnitude of the engine speed change is large, then a hydraulic control pressure is lowered for a certain period of time to advance the timing of operating of a hydraulic pressure release valve to quickly disengage a previous-gear-position clutch. If the magnitude of the engine speed change is small, then the control pressure is increased to delay the timing of operation of the hydraulic pressure release valve to allow the previous-gear-position clutch to be disengaged after a next-gear-position clutch starts to be engaged.

8 Claims, 6 Drawing Sheets

APPARATUS FOR CONTROLLING GEARSHIFTS IN AUTOMATIC TRANSMISSION

BACKGROUND OF THE INVENTION

The present invention relates to a vehicular automatic transmission for changing power transmission paths by controlling operation of hydraulic gearshift means.

Automatic transmission for automobiles are arranged to shift gears automatically dependent on running conditions of a motor vehicle to achieve desired vehicle running characteristics. It is customary to provide a gearshift map composed of upshifting and downshifting curves for each gear position, the curves being established in relation to the vehicle speed and the engine power output, and to control the automatic transmission to shift the gears according to the gearshift map dependent on the running conditions as indicated on the gearshift map. One example of such gear shifting control is disclosed in Japanese Laid-Open Patent Publication No.61-189354, for example.

One type of automatic transmission includes a power transmission means comprising a plurality of power transmission paths (e.g., a plurality of gear trains), a plurality of gearshift means (e.g., a plurality of hydraulically operated clutches) for selecting the power transmission paths, and a control means (e.g., a hydraulic pressure control valve) for controlling operation of the gearshift means. When a running conditions of a motor vehicle, as indicated on a gearshift map, moves across an upshifting or downshifting line, a gearshift command is produced to effect an upshift or downshift, and a solenoid valve is operated based on the gearshift command to control operation of the hydraulic pressure control valve to engage one of the hydraulically operated clutches. The power transmission path through a certain gear train associated with the engaged clutch is now selected to effect a gearshift.

The gear ratio of previous gear position (which is established by a power transmission path or gear train that has been selected until a gearshift command is issued), and the gear ratio of a next gear position (which is established by a power transmission path or gear train selected by the gearshift command) are different from each other. Therefore, it is important that the transmission be controlled not to produce a gearshift shock and a gearshift delay when a gearshift is made from the previous gear position to the subsequent gear position.

It has been proposed to connect an accumulator to the hydraulically operated clutches or gearshift means to lessen a change in the torque applied for engaging a next-gear-position clutch smoothly when making a gearshift, or to provide a hydraulic pressure release valve (such as an orifice control valve, a timing valve, or the like) for releasing the hydraulic pressure from a previous-gear-position clutch at a rate corresponding to the rate at which the hydraulic pressure in a next-gear-position clutch is increased, so that the hydraulic clutch pressure is controlled depending on the engine power output (see Japanese Laid-Open Patent Publication No. 60-211152, for example).

When the accelerator pedal is depressed and the transmission is shifted down (a "power-on/downshift" mode corresponding to a kickdown) or when the accelerator pedal is released and the transmission is shifted up (a "power-off/upshift" mode), a smooth and shock-free gearshift can be effected by engaging the next-gear-position clutch when the rotational speeds of the input and output shafts thereof are synchronized. The rotational speed of the engine is varied in the direction in which the rotational speeds of the input and output shafts of the next-gear-position clutch are synchronized by releasing the previous-gear-position clutch.

A difference in gear ratio between the gear position achieved when the previous-gear-position clutch is engaged and the gear ratio of the gear position achieved when the next-gear-position clutch is engaged is constant, a change produced in the rotational speed of the engine when a gear-shift is made varies depending on the engine rotational speed at the time of starting the gearshift. For example, when a gearshift is made from the third gear position down to the second gear position while the engine rotational speed is 1000 RPM, the engine rotational speed increases by 500 RPM to 1500 RPM. When the same gearshift is effected while the engine rotational speed is 2000 RPM, the engine rotational speed increases by 1000 RPM up to 3000 RPM.

With the absolute value of the change in the rotational engine speed being thus varied, the time consumed until the rotational speeds of the input and output shaft of the next-gear-position clutch are synchronized is also varied. According to the conventional gearshift control, since the hydraulic pressure is released from the previous-gear-position clutch and the hydraulic pressure is increased in the next-gear-position clutch at a constant rate, it has been difficult to effect smooth gearshifts for all engine rotational speeds.

SUMMARY OF THE INVENTION

In view of the aforesaid problems of the conventional automatic transmissions, it is an object of the present invention to provide an apparatus for controlling gearshifts in an automatic transmission depending on the magnitude of a change produced in the rotational speed of an engine when a gearshift is made, so that the gearshift can be effected smoothly irrespective of the engine rotational speed.

According to the present invention, there is provided an apparatus for controlling gearshifts in an automatic transmission having power transmission means comprising a plurality of power transmission paths, and a plurality of hydraulic gearshift means for selecting the power transmission paths under hydraulic pressure, said gearshift means being selectively operable in response to a gearshift command for switching said power transmission paths to effect gearshifts, said apparatus comprising: a hydraulic pressure release valve for releasing a hydraulic pressure from the hydraulic gearshift means associated with a previous gear position when said gearshift command is issued; a control pressure control valve for generating a hydraulic control pressure to control operation of said hydraulic pressure release valve; and control means responsive to a gearshift command for a power-on/downshift or a power-off/upshift for controlling said hydraulic control pressure depending on the magnitude of a gearshift-dependent change in the rotational speed of an engine associated with the automatic transmission, for thereby controlling operation of said hydraulic pressure release valve.

When a gearshift command for power-on/downshift or power-off/upshift mode is issued, the magnitude of a change in the engine rotational speed due to the gearshift is calculated from the vehicle speed or the engine rotational speed at the beginning of the gearshift and from the gear ratio of a gear position to be reached by the gearshift. If the magnitude of the engine speed change is large, then the control pressure is lowered for a certain period of time to advance the timing of operation of the hydraulic pressure release valve to quickly disengage the previous-gear-position clutch. If the magnitude of the engine speed change is small, then the control pressure is increased to delay the timing of operation of the hydraulic pressure release valve to allow the previous-gear-position clutch to be disengaged after the next-gear-position clutch starts to be engaged.

Further scope of applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
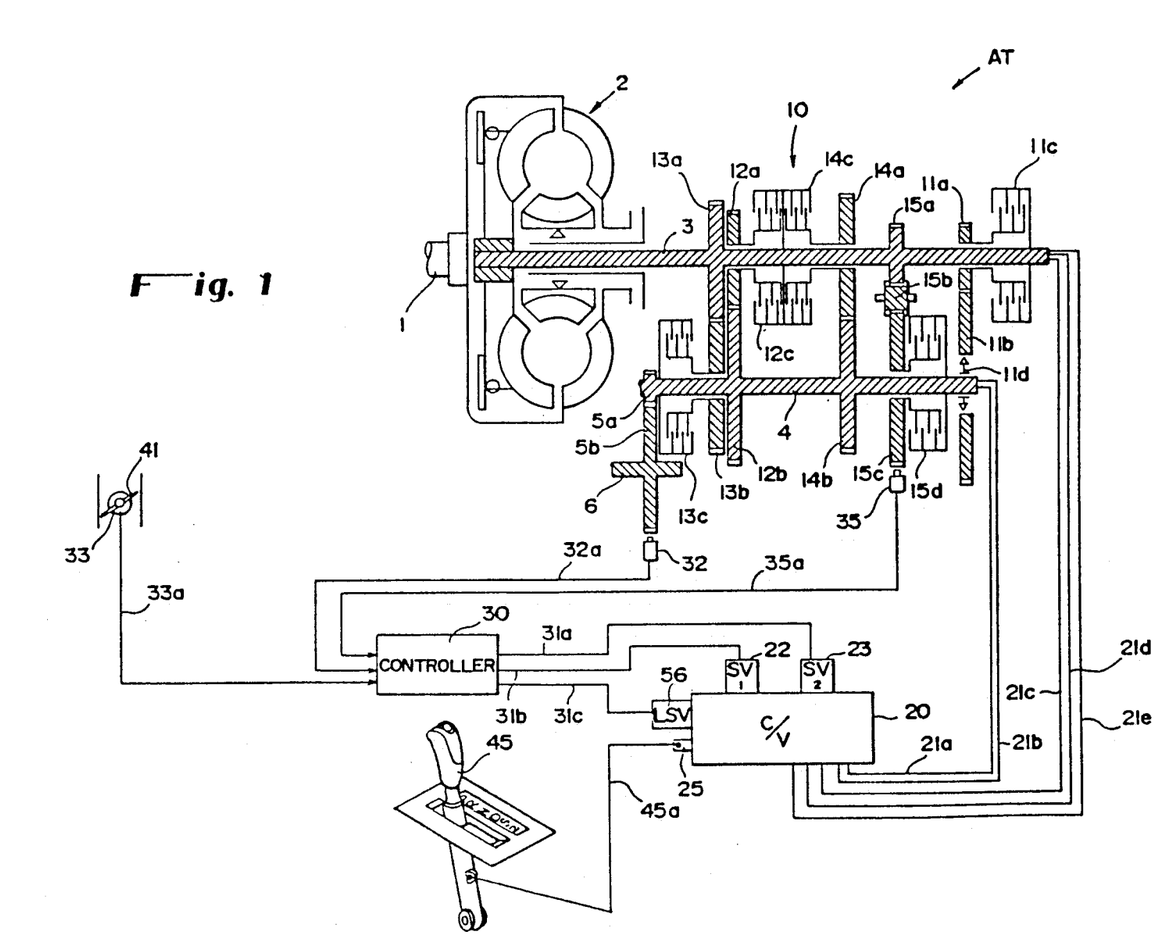
FIG. 1 is a schematic view of an automatic transmission controlled by a gearshift control apparatus according to the present invention.

FIG. 1 schematically shows an automatic transmission which is mounted on a motor vehicle and controlled by a gearshift control apparatus according to the present invention. The automatic transmission, generally denoted at AT, has a transmission mechanism 10 comprising a plurality of gear trains for changing the speed of rotation of the engine power output transmission from a torque converter 2 and for applying the engine power output to an output shaft 6. More specifically, the engine power output from the torque converter 2 is applied to an input shaft 3, and then transmitted, while its rotational speed is being changed, to a countershaft 4 extending parallel to the input shaft 3 through a selected one of five gear trains disposed parallel between the input shaft 3 and the countershaft 4. The engine power output is then applied from the countershaft 4 to the output shaft 6 through output gears 5a, 5b disposed between the countershaft 4 and the output shaft.

The five gear trains between the input shaft and the countershaft 4 include a gear train composed of gears 11a, 11b for a first gear position, a gear train composed of gear 12a, 12b for a second gear position, a gear train composed of gears 13a, 13b for a third gear position, a gear train composed of gears 14a, 14b for a fourth gear position, and a gear train composed of gears 15a, 15b, 15c for a reverse gear position. These gear trains are associated respectively with hydraulically operated clutches 11c, 12c, 13c, 14c, 15d for enabling the gear trains to transmit the engine power output from the input shaft 3 to the countershaft 4. A one-way clutch 11d is disposed in the gear 11b. By selectively operating the hydraulically operated clutches, one of the five gear trains is selected for engine power transmission while changing the rotational speed of the transmitted engine power output.

The five hydraulically operated clutches 11c through 15d are controlled in operation by a hydraulic pressure supplied and discharged through hydraulic pressure lines 21a through 21e from and to a hydraulic pressure control valve assembly 20.

The hydraulic pressure control valve assembly 20 is operated by a manual spool valve 25 coupled by a wire 45a to a shift lever 45 movable by the driver, two solenoid valves 22, 23, and a linear solenoid valve 56.

The solenoid valves 22, 23 are selectively actuated and inactivated by operating signals supplied from a controller 30 through signal lines 31a, 31b. The linear solenoid valve 56 is operated by a signal supplied from the controller 30 via a signal line 31c. The controller 30 is supplied with a rotational speed signal fed via a signal line 35a from a first rotational speed sensor 35 which detects the rotational speed of an input member of the hydraulically operated clutch 15d based on rotation of the reverse gear 15c, a rotational speed signal fed via a signal line 32a from a second rotational speed sensor 32 which detects the rotational speed of an output member of the hydraulically operated clutch 13c based on rotation of the output gear 5b, and a throttle valve opening signal fed via a signal line 33a from a throttle valve opening sensor 33 which detects the opening of an engine throttle valve 41.

Operation to control gear shifting in the automatic transmission of the above construction will be described below.

Gear shifting control is performed dependent on a shift range selected by the manual valve 25 of the hydraulic pressure control valve assembly 20 is response to manual operation of the shift lever 45. Available shift ranges include shift ranges or positions P, R, N, D, S, 2, for example. In the ranges P and N, all the clutches 11c through 15d are disengaged and the transmission is in a neutral position. In the range R, the reverse-gear-position clutch 15d is engaged to select the reverse gear position. In the ranges D, S, and 2, gear positions are selected based on a gear shift map.

Figure 2:
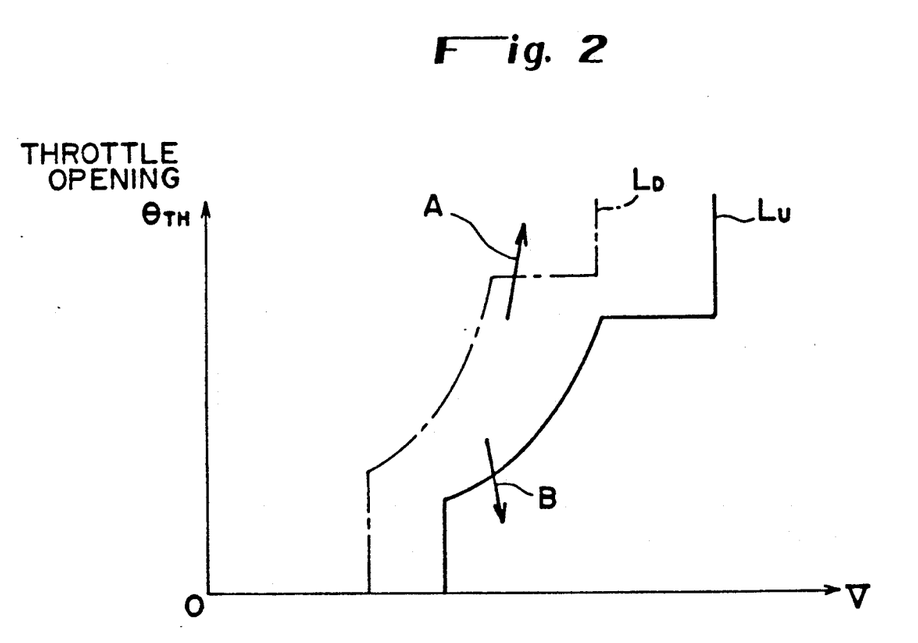
FIG. 2 is a graph illustrating a gear shift map used for gearshift control.

As shown in FIG. 2, the gear shift map is composed of an upshifting line $L_U$ and a downshifting line $L_D$, these curves being plotted in a graph having vertical axis indicating the throttle valve opening $\theta_{TH}$ and a horizontal axis indicating the vehicle speed V. When a point on the gear shift map which represents the running condition of the motor vehicle as determined by the engine throttle valve opening (the amount of depression of the accelerator pedal) and the vehicle speed moves to the right across the upshifting line $L_U$, the transmission effects a gear upshift. When the point moves to the left across the downshifting line $L_D$ after the upshift, the transmission effects a gear downshift.

Therefore, a power-on/downshift mode is effected when the running condition point moves as indicated by the arrow A, and a power-off/upshift mode is effected when the running condition point moves as indicated by the arrow B.

While the gear shift map of FIG. 2 is shown as having one upshifting line and one downshifting line, the gear shift map actually has a plurality of upshifting curves and a plurality of downshifting curves dependent on the number of gear positions available in the transmission.

When the running condition point in the gear shift map goes across the upshifting or downshifting line, the controller 30 applies operating signals over the signal lines 31a, 31b to the solenoid valves 22, 23 to operate the hydraulic pressure control valve assembly 20 to supply hydraulic pressure to and discharge hydraulic pressure from the hydraulically operated clutches 11c through 11d for effecting an upshift or a downshift.

Figure 3:
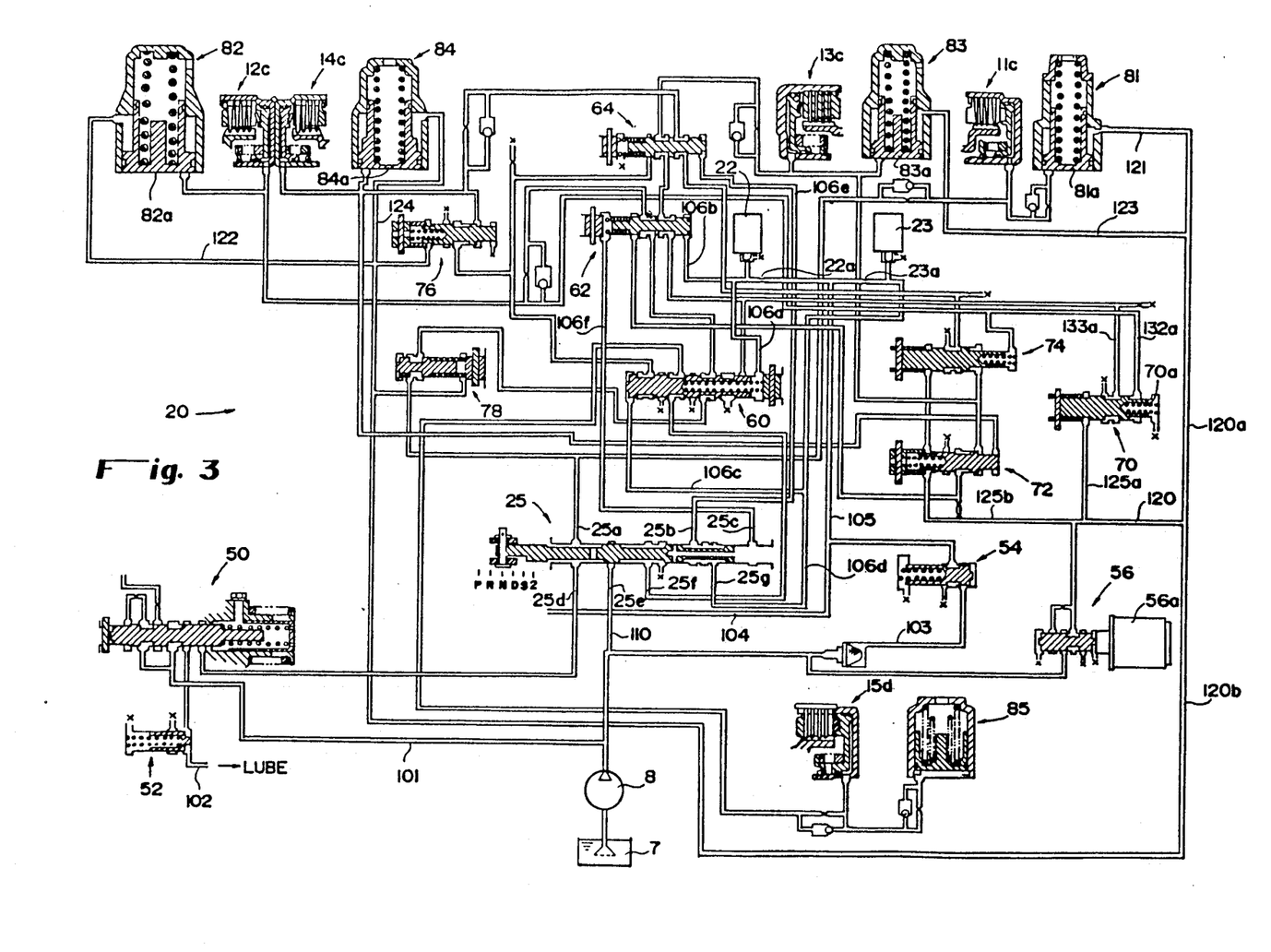
FIG. 3 is a circuit diagram of a hydraulic circuit including a hydraulic control valve assembly for controlling gearshifts in the automatic transmission.

The hydraulic pressure control valve assembly 20 will be described below with reference to FIG. 3.

The control valve 20 delivers operating oil supplied from an oil sump 7 by a pump 8 to a regulator valve 50 via a line 101, and the pressure of the delivered operating oil is regulated into a predetermined line pressure by the regulator valve 50. The line pressure is applied via a line 110 to the manual spool valve 25 which then selectively supplies the line pressure to the gear position clutches 11c, 12c, 13c, 14c, 15d to control these clutches, dependent on operation of the manual spool valve 25 and various other valves in the control valve assembly 20 according to running conditions of the motor vehicle.

The various valves in the control valve assembly 20 will be described below. The control valve assembly 20 includes a check valve 52 disposed downstream of the regulator valve 50 for preventing the oil of lubricating oil supplied to various parts of the automatic transmission AT via a line 102 from rising beyond a predetermined pressure level. A modulator valve 54 reduces the line pressure fed from a line 103 to produce a prescribed modulator pressure. The modulator valve 54 then supplied working oil under the modulator pressure via a line 104 to a lockup clutch control circuit (not shown) of the torque converter 2 and also via a line 105 to the first and second solenoid valves 22, 23 for controlling operation of shift valves.

The manual spool valve 25 is operated in interlinked relation to the shift lever 45 that is manually moved by the driver. The manual valve 25 is selectively positioned in any one of six positions P, R, N, D, S, 2 for selectively supplying the line pressure from the line 110 to lines 25a through 25g.

When the manual valve 25 is in any one of the positions D, S, 2, a 1-2 shift valve 60, a 2-3 shift valve 62, and a 3-4 shift valve 64 are controlled by the modulator pressure supplied via lines 106a through 106f dependent on whether the first and second solenoid valves 22, 23 are turned on or off, for controlling the supply of the line pressure to and the discharge of the line pressure from the clutches 11c, 12c, 13c, 14c for the first through fourth gear positions, respectively.

The lines 106a, 106d are connected to the first solenoid valve 22 and also to the line 105 through an orifice 22a. When the solenoid of the first solenoid valve 22 is de-energized, its port leading to a drain is closed, and working oil under the modulator pressure is supplied from the line 105 to the lines 106a, 106b. When the solenoid of the first solenoid valve 22 is energized, the drain port thereof is opened to reduce the pressure in the lines 106a, 106b substantially to zero. The lines 106c through 106f are connected to the second solenoid valve 23 and also to the line 105 via an orifice 23a. When the solenoid of the second solenoid valve 23 is turned off, the drain port thereof is closed to allow the working oil under the modulator pressure to be supplied from the line 105 to the lines 106c through 106f. When the solenoid of the second solenoid valve 23 is turned on, the drain port there of is opened to reduce the pressure in the lines 106c through 106f substantially to zero.

The line 106a is connected to the righthand end (as shown) of the 1-2 shift valve 60, the line 106b is connected to the righthand end of the 2-3 shift valve 62, the line 106c is connected to the lefthand end of the 1-2 shift valve 60, the line 106e is connected to the righthand end of the 3-4 shift valve 64, and the line 106f is connected to the lefthand end of the 2-3 shift valve 62. The lines 106e, 106f are coupled to the second solenoid valve 23 through the manual valve 25 and the line 106d. Therefore, by controlling the operation of the first and second solenoid valves 22, 23 to control the supply of the modulator pressure from the line 105 to the lines 106a through 106f, the operation of the 1-2, 2-3, and 3-4 valves 60, 62, 64 can be controlled to selectively supply the line pressure fed from the line 110 via the manual valve 25 to the hydraulically operated clutches 11c, 12c, 13c, 14c for selecting a desired gear position.

The control valve assembly 20 further includes accumulators 81, 82, 83, 84 having pressure bearing chambers communicating respectively with the hydraulic pressure chambers of the hydraulically operated clutches 11c, 12c, 13c, 14c. The accumulators 81, 82, 83, 84 also have back pressure chambers opposite to the respective pressure bearing chambers with pistons 81a, 82a, 83a, 84a therebetween, the back pressure chambers being connected to respective lines 121, 122, 123, 124 which are coupled to the linear solenoid valve 56 via lines 120a, 120b and a line 120.

The linear solenoid valve 56 has a linear solenoid 56a. A current supplied to the linear solenoid 56a is controlled to control the operating force of the linear solenoid valve 56 for controlling the magnitude of a hydraulic pressure (control pressure $P_{TH}$) to be supplied to a line 120. By controlling the current supplied to the linear solenoid 56a, therefore, the hydraulic pressure in the back pressure chambers of the accumulators 81 through 84 can be controlled to control the hydraulic pressure in the hydraulic pressure chamber in an engaged clutch (next-gear-position clutch) when a gearshift is effected. The control pressure $P_{TH}$ is also employed for controlling the operation of orifice control valves or hydraulic pressure release valves (described later on). Thus, the linear solenoid valve 56 serves as a control pressure control valve when making a gearshift.

The control valve assembly 20 also has first, second, third, and fourth orifice control valves 70, 72, 74, 76 for releasing hydraulic pressure from the hydraulic pressure chamber in the clutch associated with a previous gear position in timed relation to the development of a pressure buildup in the hydraulic pressure chamber in the clutch associated with a next gear position, when a gearshift is effected. The first through fourth orifice control valves 70, 72, 74, 76 serve as hydraulic pressure release valves.

The first orifice control valve 70 controls the timing of releasing the hydraulic pressure from the third-gear-position clutch when a downshift is effected for the third gear position to the second gear position. The second orifice control valve 72 controls the timing of releasing the hydraulic pressure from the second-gear-position clutch when an upshift is carried out from the second gear position to the third gear position or from the second gear position to the fourth gear position. The third orifice control valve 74 controls the timing of releasing the hydraulic pressure from the fourth-gear-position clutch upon a down-shift from the fourth gear position to the third gear position or from the fourth gear position to the second gear position. The fourth orifice control valve 76 controls the timing of releasing the hydraulic pressure from the third-gear-position clutch at the time of an upshift from the third gear position to the fourth gear position.

The first orifice control valve 70 is normally urged to the left by a spring 70a, and a supplied on its righthand side with the hydraulic pressure from the second-gear-position clutch through a line 132a and on its lefthand side with the control pressure $P_{TH}$ through a line 125a. The timing of releasing the hydraulic pressure from the third-gear-position clutch through a line 133a to drain upon a gearshift from the third gear position to the second gear position is established by a balanced condition between the bias of the spring 70a, the hydraulic pressure in the second-gear-position clutch (next-gear-position clutch), and the control pressure $P_{TH}$. Therefore, the timing of releasing the hydraulic pressure from the third-gear-position clutch or next-gear-position clutch can be controlled by controlling the control pressure $P_{TH}$ when a gearshift is to be made.

The second through fourth orifice control valves 72, 74, 76 operate in the same manner as the first orifice control valve 70. Each of the second through fourth orifice control valves 72, 74, 76 can establish the timing of releasing the hydraulic pressure from the previous-gear-position clutch depending on a balanced condition between the hydraulic pressure from the next-gear-position clutch and the control pressure $P_{TH}$.

A clutch pressure control valve 78 is disposed in a line extending from the manual valve 25 to the 1-2 shift valve 60, and is operable in response to the control pressure $P_{TH}$ as regulated by the linear solenoid valve 56. Therefore, the line pressure supplied through the shift valves 60, 62, 64 to the hydraulically operated clutches 11c, 12c, 13c, 14c are controlled in response to the control pressure $P_{TH}$ by the clutch pressure control valve 78. Except when gearshifts are made, the control pressure $P_{TH}$ is controlled so as to correspond to the engine power output. Thus, the line pressure for operating the hydraulically operated clutches can be set to as low a pressure as possible for obtaining necessary torque capacity corresponding to the engine power output.

In the hydraulic pressure control valve assembly 20 thus constructed, the manual valve 25 is operated by the shift lever 45 and the solenoid valves 22, 23 are turned on and off to selectively supply the line pressure to the hydraulically operated clutches 11c, 12c, 13c, 14c for automatically selecting a gear position.

Figure 4:
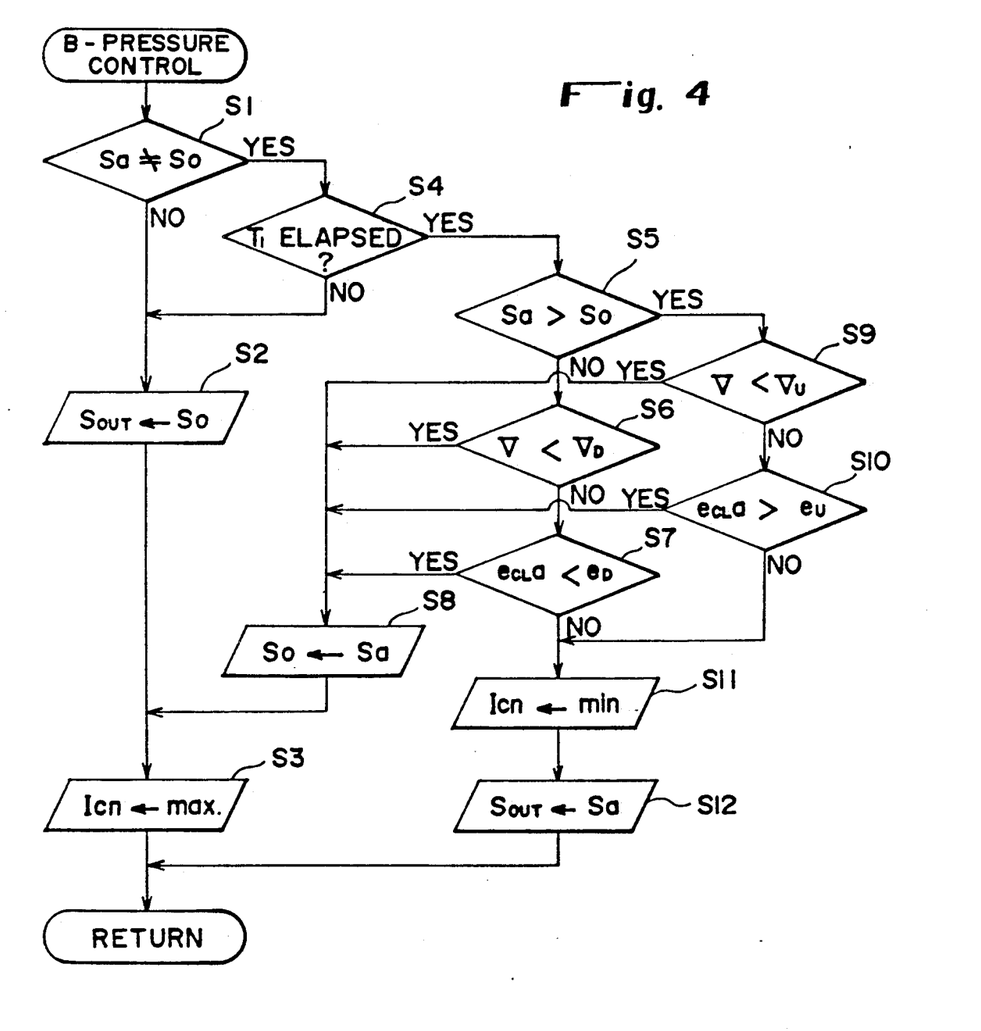
FIG. 4 is a flowchart showing a control sequence for the gearshift control apparatus of the invention.

Operation of the linear solenoid valve 56 (control pressure control valve) when a gearshift is made in the power-on/downshift and power-off/upshift modes will be described below with reference to the flowchart of FIG. 4.

First, a step S1 determines a present gear position So is different from a target gear position Sa or not, i.e., whether a gearshift command signal is issued or not. If Sa≠So (a gearshift command signal is not issued), then the present gear position So is maintained in a step S2, and an electric current Icn flowing through the linear solenoid 56a is maximized to increase the control pressure $P_{TH}$ to its maximum level in a step S3.

If Sa≠So, then control goes to a step S5 after elapse of a period of time set by a decision timer $T_1$ (step S4) to avoid too frequent gearshifts. The step S5 determines whether Sa>So, i.e., whether the gearshift command signal indicates an upshift or a downshift.

If Sa>So, i.e., the gearshift command signal indicates an upshift, and if the engine mode is a power-off mode (the control of a power-on mode is effected according to another control sequence and will not be described in this embodiment), then a step S9 determines whether the vehicle speed V is lower than a predetermined vehicle speed $V_U$ or not.

Insofar as the gear position remains the same, the vehicle speed is proportional to the engine rotational speed. Therefore, the magnitude of a change in the engine rotational speed in the gear position can be known from determining the magnitude of the vehicle speed V. If $V<V_U$ indicating that the change in the engine rotational speed in the gear position is smaller than a predetermined level, then control goes from the step S9 to a step S8 in which the target gear position Sa is set to the present gear position So, and then to the step S3 in which the current Icn supplied to the linear solenoid 56a is maximized to increase the control pressure $P_{TH}$ to the maximum level. The steps S1, S2, S3 are then effected to make a gearshift to the present gear position So (which has been set to the next gear position in the step S8).

If $V> =V_\mu$, then since the change in the engine rotational speed due to the gearshift is greater than the predetermined level, the current Icn supplied to the linear solenoid valve 56a is minimized to minimize the control pressure $P_{TH}$ in a step S11 until the ratio $e_{CLa}$ of the rotational speeds of the input and output shafts of the next-gear-position clutch is larger than a threshold $e_U$ slightly smaller than 1.0, indicating that the rotational speeds of the input and output shafts of the next-gear-position clutch are synchronized (step S10), and a gearshift is made to the target gear position Sa in a step S12. Thereafter, if $e_{CLa}>e_U$, the target gear position Sa is set to the present gear position in the step S8, and the control pressure $P_{TH}$ is maximized in the step S3. The steps S1, S2, S3 are then carried out to effect a gearshift to the next gear position.

If Sa<So, i.e., the gearshift command signal indicates a downshift, and if the engine mode is a power-on mode (the control of a power-off mode is not shown), then a step S6 determines whether the vehicle speed V is lower than a predetermined vehicle speed $V_D$ or not. The increase in the engine rotational speed due to the gearshift is smaller than a predetermined level, then control goes from the step S6 to the step S8 in which the target gear position Sa is set to the present gear position So, and then to the step S3 in which the current Icn supplied to the linear solenoid 56 a is maximized to increase the control pressure $P_{TH}$ to the maximum level. The steps S1, S2, S3 are then effected to make a gearshift to the next gear position.

If $V> =V_D$, then since the change in the engine rotational speed owing to the gearshift is greater than the predetermined level, the current Icn supplied to the linear solenoid valve 56a is minimized to minimize the control pressure $P_{TH}$ in the step S11 until the ratio $e_{CLa}$ of the rotational speeds of the input and output shafts of the next-gear-position clutch is larger than a threshold $e_D$ slightly larger than 1.0, indicating that the rotational speeds of the input and output shafts of the next-gear-position clutch are synchronized (step S7), and a gearshift is made to the target gear position Sa in the step S8, and the control pressure $P_{TH}$ is maximized in the step S3. The steps S1, S2, S3 are then carried out to effect a gearshift to the next gear position.

Figure 5A:
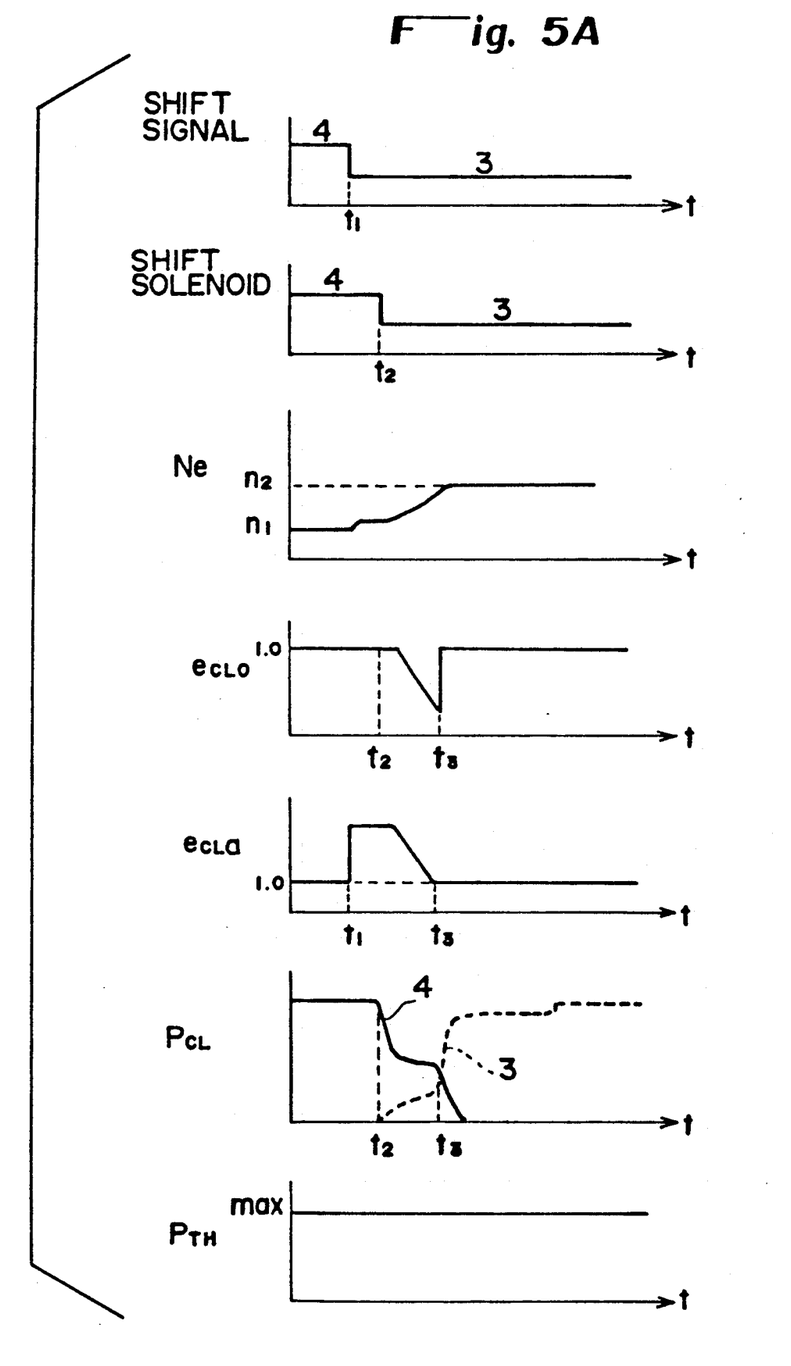
FIG. 5A and 5B are graphs showing how gearshift command signals, shift solenoid outputs, etc., vary with respect to time under gearshift control for effecting various gearshift.
Figure 5B:
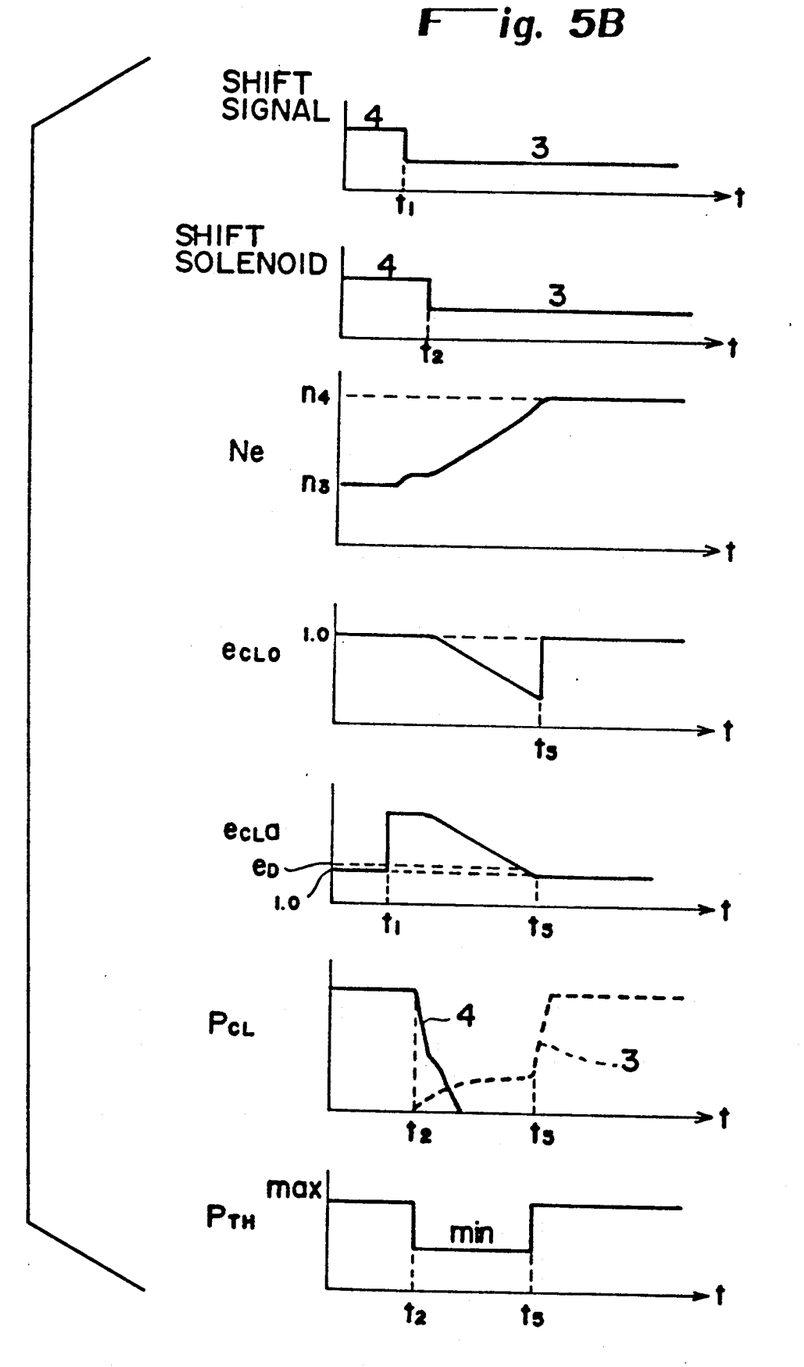

Specific examples of the above control sequence will be described with reference to FIG. 5A and 5B for a kickdown (power-on/downshift mode) from the fourth gear position to the third gear position. FIG. 5A shows an example in which the vehicle speed V is lower than the predetermined vehicle speed $V_D$, and FIG. 5B an example in which the vehicle speed V is higher than the predetermined vehicle speed $V_D$.

First, the example in which the vehicle speed V is $V < = V_D$ immediately before a gearshift is made will be described below. When the accelerator pedal is quickly depressed at a time $t_1$ and a gearshift command signal from the fourth gear position to the third gear position is issued, the output from the shift solenoid indicates the third gear position at a time $t_2$ after elapse of the time set by the decision timer $T_1$. Since $V < V_D$ at this time, the change in the engine rotational speed due to the gear-shift is small. Therefore, if the fourth-gear-position clutch which is the previous-gear-position clutch were disengaged at this time, the engine rotational speed would be quickly be increased until the rotational speeds of the input and output shafts of the third-gear-position clutch are synchronized. Because there is a certain period of time elapsed before the third-gear-position clutch starts being engaged, owing to the time required for oil to fill the oil passage leading to the third-gear-position clutch, and the ineffective stroke of the clutch piston thereof, the engine rotational speed would be increased beyond the synchronized rotational speed of the third-gear-position clutch before the third-gear-position clutch is engaged.

To avoid the above problem, the control pressure $P_{TH}$ is kept at the maximum level as shown in FIG. 5A. The control pressure $P_{TH}$ is applied to the lefthand side of the third orifice control valve 74 which controls the timing of releasing the hydraulic pressure from the fourth-gear-position clutch when a gearshift is made from the fourth gear position to the third gear position. Consequently, the hydraulic pressure in the fourth-gear-position clutch is not released until the hydraulic pressure applied from the fourth-gear-position clutch to the righthand side of the third orifice control valve 74 becomes higher than a predetermined level. Even if the shift solenoid is shifted for the third gear position, therefore, the fourth-gear-position clutch remains engaged until the third-gear-position clutch starts to be engaged. While the fourth-gear-position clutch is being engaged, the engine rotational speed is prevented from racing, so that the gearshift can be effected smoothly.

When $V > V_D$ immediately before the gearshift is made and hence the change in the engine rotational speed due to the gearshift is large, it takes a certain period of time until the engine rotational speed increases up to the synchronized speed of the input and output shafts of the third-gear-position clutch, even if the fourth-gear-position clutch which is the previous-gear-position clutch is disengaged. In this case, the control pressure $P_{TH}$ is minimized at the same time that the shift solenoid is shifted for the third gear position at a time $t_2$. The hydraulic pressure applied to the lefthand side of the third orifice control valve 74 is thus lowered to release the hydraulic pressure immediately from the fourth-gear-position clutch.

The hydraulic pressure in the third-gear-position clutch is not increased substantially since the control pressure $P_{TH}$ which is the back pressure in the accumulator 83 for the third-gear-position clutch 13c, and the third-gear-position clutch remains also disengaged. At this time, the ratio $e_{CLa}$ of the rotational speeds of the input and output shafts of the third-gear-position clutch which is the next-gear-position clutch is monitored. If the ratio $e_{CLa}$ drops smaller than the threshold $e_D$, thus detecting that the rotational speeds of the input and output shafts of the third-gear-position clutch are substantially synchronized, then the current supplied to the linear solenoid valve 56a is maximized to maximize the control pressure $P_{TH}$ at a time $t_5$. The third-gear-position clutch is engaged when the rotational speeds of the input and output shafts thereof are synchronized, so that the gearshift can be effected smoothly without engine racing.

In the above embodiment, the magnitude of a change in the engine rotational speed upon a gearshift is determined based on the vehicle speed. However, the magnitude of a change in the engine rotational speed may be determined by directly detecting the engine rotational speed. When a gearshift is effected from the fourth gear position to the second gear position while the engine rotational speed is low (i.e., the vehicle speed is low), the change in the engine rotational speed is large. In this case, the control pressure $P_{TH}$ is temporarily lowered as shown in FIG. 5B.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is;

1. An apparatus for controlling gearshifts in an automatic transmission having power transmission means comprising a plurality of power transmission paths, and a plurality of hydraulic gearshift means for selecting the power transmission paths under hydraulic pressure, said gearshift means being selectively operable in response to a gearshift command for switching said power transmission paths to effect gearshifts, said apparatus comprising:

a hydraulic pressure release valve for releasing a hydraulic pressure from the hydraulic gearshift means associated with a previous gear position when said gearshift command is issued wherein operation of said hydraulic pressure release valve is controlled based on a hydraulic control pressure generated by a control pressure control valve and a hydraulic pressure from the hydraulic gearshift means associated with a next-gear-position; and control means responsive to a gearshift command for a power-on/downshift or a power-off/upshift for controlling said hydraulic control pressure depending on a magnitude of a gearshift-dependent change in a rotational speed of an engine associated with the automatic transmission, for thereby controlling operation of said hydraulic pressure release valve.

2. An apparatus according to claim 1, wherein said control means comprises means for determining the magnitude of the change in the rotational speed of the engine based on the speed of a vehicle, on which the automatic transmission is mounted, when the gearshift is made.

3. An apparatus according to claim 1 or 2, wherein said control means comprises means for delaying a timing of releasing, by said hydraulic pressure release valve, of the hydraulic pressure from the hydraulic gearshift means associated with the previous gear position when said hydraulic control pressure is increased, and for advancing said timing when said hydraulic control pressure is lowered.

4. An apparatus according to claim 3, wherein said control means comprises means for advancing said timing by lowering said hydraulic control pressure when the magnitude of the change in the rotational speed of the engine is large, and for delaying said timing by increasing said hydraulic control pressure when the magnitude of the change in the rotational speed of the engine is small.

5. An apparatus for controlling gearshifts in an automatic transmission having power transmission means comprising a plurality of power transmission paths, and a plurality of hydraulic gearshift means for selecting the power transmission paths under hydraulic pressure, said gearshift means being selectively operable in response to a gearshift command for switching said power transmission paths to effect gearshifts, said apparatus comprising:
  a hydraulic pressure release valve for releasing a hydraulic pressure from the hydraulic gearshift means associated with a previous gear position when said gearshift command is issued;
  a control pressure control valve for generating a hydraulic control pressure to control operation of said hydraulic pressure release valve; and
  control means responsive to a gearshift command for a power-on/downshift or a power-off/upshift for controlling said hydraulic control pressure depending on a magnitude of a gearshift-dependent change in a rotational speed of an engine associated with the automatic transmission, for thereby controlling operation of said hydraulic pressure release valve wherein said control means comprises means for delaying the timing of releasing, by said hydraulic pressure release valve, of the hydraulic pressure from the hydraulic gearshift means associated with the previous gear position when said hydraulic control pressure is increased, and for advancing said timing when said hydraulic control pressure is lowered.

6. An apparatus for controlling gearshifts in an automatic transmission having power transmission means comprising a plurality of power transmission paths, and a plurality of hydraulic gearshift means for selecting the power transmission paths under hydraulic pressure, said gearshift means being selectively operable in response to a gearshift command for switching said power transmission paths to effect gearshifts, said apparatus comprising:
  a hydraulic pressure release valve for releasing a hydraulic pressure from the hydraulic gearshift means associated with a previous gear position when said gearshift command is issued;
  a control pressure control valve for generating a hydraulic control pressure to control operation of said hydraulic pressure release valve; and
  control means responsive to a gearshift command for a power-on/downshift or a power-off/upshift for controlling said hydraulic control pressure depending on a magnitude of a gearshift-dependent change in a rotational speed of an engine associated with the automatic transmission, for thereby controlling operation of said hydraulic pressure release valve wherein said control means comprises means for determining the magnitude of the change in the rotational speed of the engine based on the speed of a vehicle, on which the automatic transmission is mounted, when the gearshift is made and means for delaying the timing of releasing, by said hydraulic pressure release valve, of the hydraulic pressure from the hydraulic gearshift means associated with the previous gear position when said hydraulic control pressure is increased, and for advancing said timing when said hydraulic control pressure is lowered.

7. An apparatus for controlling gearshifts in an automatic transmission having power transmission means comprising a plurality of power transmission paths, and a plurality of hydraulic gearshift means for selecting the power transmission paths under hydraulic pressure, said gearshift means being selectively operable in response to a gearshift command for switching said power transmission paths to effect gearshifts, said apparatus comprising:
  a hydraulic pressure release valve for releasing a hydraulic pressure from the hydraulic gearshift means associated with a previous gear position when said gearshift command is issued;
  a control pressure control valve for generating a hydraulic control pressure to control operation of said hydraulic pressure release valve; and
  control means responsive to a gearshift command for a power-on/downshift or a power-off/upshift for controlling said hydraulic control pressure depending on a magnitude of a gearshift-dependent change in a rotational speed of an engine associated with the automatic transmission, for thereby controlling operation of said hydraulic pressure release valve, wherein said control means comprises means for delaying the timing of releasing, by said hydraulic pressure release valve, of the hydraulic pressure from the hydraulic gearshift means associated with the previous gear position when said hydraulic control pressure is increased, and for advancing said timing when said hydraulic control pressure is lowered and means for advancing said timing by lowering said hydraulic control pressure when the magnitude of the change in the rotational speed of the engine is large, and for delaying said timing by increasing said hydraulic control pressure when the magnitude of the change in the rotational speed of the engine is small.

8. An apparatus for controlling gearshifts in an automatic transmission having power transmission means comprising a plurality of power transmission paths, and a plurality of hydraulic gearshift means for selecting the power transmission paths under hydraulic pressure, said gearshift means being selectively operable in response to a gearshift command for switching said power transmission paths to effect gearshifts, said apparatus comprising:

a hydraulic pressure release valve for releasing a hydraulic pressure from the hydraulic gearshift means associated with a previous gear position when said gearshift command is issued;

a control pressure control valve for generating a hydraulic control pressure to control operation of said hydraulic pressure release valve; and control means responsive to a gearshift command for a power-on/downshift or a power-off/upshift for controlling said hydraulic control pressure depending on a magnitude of a gearshift-dependent change in a rotational speed of an engine associated with the automatic transmission, for thereby controlling operation of said hydraulic pressure release valve, wherein said control means comprises means for determining the magnitude of the change in the rotational speed of the engine based on the speed of a vehicle, on which the automatic transmission is mounted, when the gearshift is made and means for delaying the timing of releasing, by said hydraulic pressure release valve, of the hydraulic pressure from the hydraulic gearshift means associated with the previous gear position when said hydraulic control pressure is increased, and for advancing said timing when said hydraulic control pressure is lowered and means for advancing said timing by lowering said hydraulic control pressure when the magnitude of the change in the rotational speed of the engine is large, and for delaying said timing by increasing said hydraulic control pressure when the magnitude of the change in the rotational speed of the engine is small.

* * * * *